(12) United States Patent
Ahn

(10) Patent No.: US 8,290,872 B2
(45) Date of Patent: Oct. 16, 2012

(54) APPARATUS AND METHOD FOR PROTECTING TRANSMISSION OF COMMUNICATION CONTENT

(75) Inventor: Kyung-Hwan Ahn, Gyeongsan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/354,971

(22) Filed: Feb. 16, 2006

(65) Prior Publication Data

US 2006/0224519 A1 Oct. 5, 2006

(30) Foreign Application Priority Data

Mar. 29, 2005 (KR) ........................ 10-2005-0025895

(51) Int. Cl.
*G06F 21/00* (2006.01)
(52) U.S. Cl. .......................................... 705/51; 705/50
(58) Field of Classification Search ...................... 705/51
See application file for complete search history.

(56) References Cited

U.S. PATENT DOCUMENTS

| | | | | | |
|---|---|---|---|---|---|
| 5,428,602 | A | * | 6/1995 | Kemppainen | 370/330 |
| 5,592,611 | A | * | 1/1997 | Midgely et al. | 714/4.3 |
| 5,825,884 | A | * | 10/1998 | Zdepski et al. | 705/78 |
| 6,219,692 | B1 | * | 4/2001 | Stiles | 709/201 |
| 6,223,209 | B1 | * | 4/2001 | Watson | 709/201 |
| 6,298,373 | B1 | * | 10/2001 | Burns et al. | 709/203 |
| 6,370,580 | B2 | * | 4/2002 | Kriegsman | 709/226 |
| 7,174,130 | B2 | * | 2/2007 | Kurisko et al. | 455/41.2 |
| 2002/0065099 | A1 | | 5/2002 | Bjorndahl | |
| 2004/0147246 | A1 | * | 7/2004 | Kim | 455/411 |
| 2004/0259499 | A1 | * | 12/2004 | Oba et al. | 455/41.2 |
| 2005/0076232 | A1 | | 4/2005 | Kawaguchi | |
| 2005/0222961 | A1 | * | 10/2005 | Staib et al. | 705/64 |
| 2007/0032193 | A1 | * | 2/2007 | Wada et al. | 455/41.2 |
| 2007/0032195 | A1 | * | 2/2007 | Kurisko et al. | 455/41.2 |
| 2008/0020707 | A1 | * | 1/2008 | Takayama et al. | 455/41.2 |
| 2009/0111378 | A1 | * | 4/2009 | Sheynman et al. | 455/41.1 |

FOREIGN PATENT DOCUMENTS

EP 0 756 397 1/1997
(Continued)

OTHER PUBLICATIONS

"Computer Networking", Kurose and Ross, $3^{rd}$ edition.*

(Continued)

*Primary Examiner* — James A Reagan
*Assistant Examiner* — Calvin Cheung
(74) *Attorney, Agent, or Firm* — Roylance, Abrams, Berdo & Goodman, L.L.P.

(57) ABSTRACT

An apparatus and method are disclosed for protecting the transmission of communication content transmitted between client and server, where a server comprises an application program which delivers a key distribution command if a request for content is received from a client, and transmits the content to the client if key distribution is completed. An encryption key management module creates and provides an encryption key. A near field communication (NFC) module performs key distribution by transmitting the encryption key created in the encryption key management module to a near field communication (NFC) module of the client. An encryption/decryption module encrypts the contents by using the encryption key. A Bluetooth module transmits the encrypted contents to a Bluetooth module of the client.

4 Claims, 1 Drawing Sheet

FOREIGN PATENT DOCUMENTS

| | | |
|---|---|---|
| EP | 1 439 661 | 7/2004 |
| KR | EP1 439 661 A1 * | 1/2004 |

OTHER PUBLICATIONS

How Networks Work. 2000, ISBN: 0789724456, Derfler et al. Chapter 17 cited and relevant.*

"Near Field Communication Technology jointly developed by Sony and Philips approved as ISO/IEC International Standard". Joint Press Release. Available from <http://www.sony.net/SonyInfo/News/Press/200312/03-059E/>. Dec. 8, 2003.*

"Near-field magnetic comms emerges". Palermo, Vincent. Oct. 31, 2003. Available from <http://www.eetimes.com/in_focus/communications/OEG20031031S0049>.*

"A Cryptography Introduction", cryptographyworld.com, all pages, Jun. 19, 2003. http://web.archive.org/web/20030619165110/http://www.cryptographyworld.com/what.htm.*

* cited by examiner

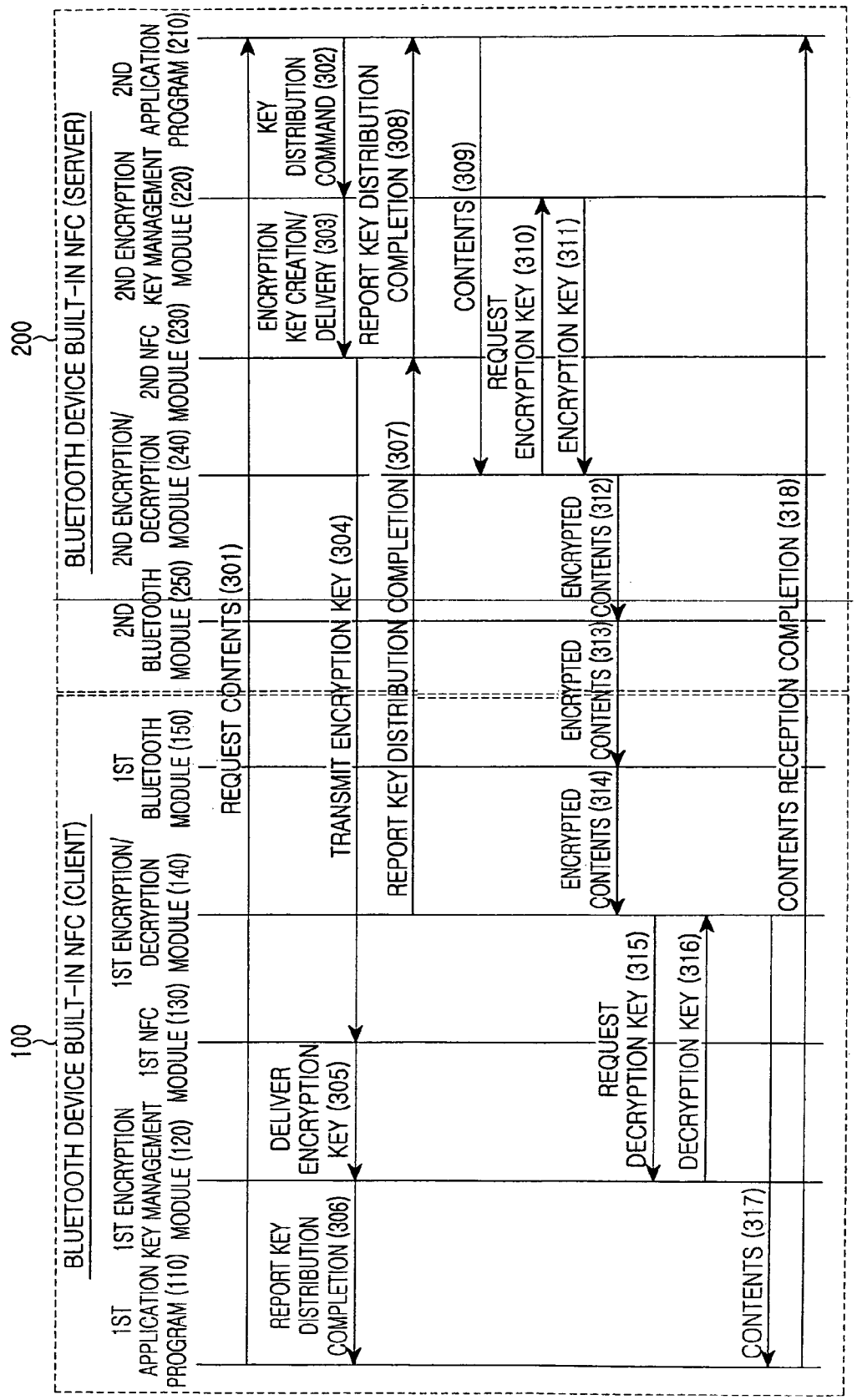

APPARATUS AND METHOD FOR PROTECTING TRANSMISSION OF COMMUNICATION CONTENT

PRIORITY

This application claims the benefit under 35 U.S.C. §119(a) of Korean Patent Application No. 2005-0025895, filed Mar. 29, 2005 in the Korean Intellectual Property Office, the entire contents of which are hereby incorporated by reference.

BACKGROUND OF THE INVENTION

1. Field of the Invention

The present invention relates to an apparatus and method for protecting the transmission of contents. More particularly, the present invention relates to an apparatus and method for protecting the transmission of contents, which can safely transmit contents.

2. Description of the Related Art

Near Field Communication (NFC) refers to a contactless-type short range wireless communication technology led by such companies as Nokia, Sony, Royal Philips Electronics, and IBM, and employs a frequency band of 13.56 Mhz and transmits data at the maximum data rate of 424 Kbps within a distance of 10 m utilizing low power consumption. As described above, a characteristic of short-range communication includes a security function. If the NFC, which is a source technology enabling various applications under a next generation ubiquitous environment, is employed, phone numbers, images, tickets, MP3 files, among other items, can be transmitted/received between devices such as mobile phones, AV equipment, digital cameras, PDAs, and set-top boxes in the near future without user operation. Recently, mobile phone manufacturing corporations such as Nokia Corporation, Motorola, Samsung, and LG, have set to develop NFC mobile phones in earnest.

In addition, Bluetooth is one of a number of standards for small-sized and low-priced wireless interfaces having low power consumption for wireless connection between portable devices, such as mobile phones and portable PCs, network access points, and other peripheral devices. Bluetooth is a communication technology enabling connection between devices separated from each other by a distance of 10 m under normal conditions (the maximum distance of 100 m) even though there are obstacles. For symmetric communication mode, Bluetooth has a data rate of 433.9 Kbps, and a data rate of 723.3 Kbps for asymmetric communication mode. When voice is transmitted, a 64 Kbps synchronous transmission mode and a maximum of three voice channels may be employed. In addition, technology supporting a data rate of 10 Mbps, which enables the transmission of a moving picture, has been developed.

The security in Bluetooth is provided only for a wireless link. The Bluetooth standard defines three security services such as confidentiality, authentication, and authorization. Confidentiality is defined for preventing the tapping of information; authentication is defined for identifying a communication device; and authorization is defined for controlling resources. These Bluetooth security services encrypt information exchanged between Bluetooth devices through a procedure of creating an initialization key using a personal identification number (PIN) of the Bluetooth devices, performing authentication, creating and exchanging link keys, and creating an encryption key.

Bluetooth has no suitable scheme of sharing PINs, however, so users must personally input their PIN into each device. In addition, the initialization key is dependent on a user's PIN, and the procedure of creating the initialization key is weak. Furthermore, Bluetooth has a structure that is inherently weak in security due to the weakness of the link key, encryption key, device authentication, and a stream cipher algorithm. Accordingly, Bluetooth is unsuitable for protecting communication content, since content may be obtained by an illegal user while it is being downloaded. This problem occurs in Wi-Fi as well as Bluetooth.

In a relationship between the Bluetooth and NFC standards, the NFC forum's sponsor members define Bluetooth as a virtual cable and NFC as a virtual connect. The NFC device mainly sets up, initializes, and authenticates a wireless protocol such as Bluetooth or Wi-Fi, and actual data transmission can be achieved based on these standards. In other words, the user authentication procedure employed in receiving transmission content, such as a moving picture, an MP3, and games, is employed by using the NFC device but the content is actually transmitted based on high-speed Bluetooth.

For example, there may be a content vending machine for moving pictures, MP3s, among others. A user having a mobile phone employing NFC and Bluetooth chips performs user authentication together with the content vending machine using NFC technology in order to download content from the content vending machine, including various items such as moving pictures and MP3s. The user may then download corresponding content from the content vending machine by encrypting the corresponding items using Bluetooth technology. However, problems related to security still remain if the security mechanism of Bluetooth is solely employed.

Accordingly, if the security mechanism of Bluetooth is complemented by providing an encryption key distribution service as well as an authentication service using the transmission characteristics of NFC technology, Bluetooth security problems may be solved.

SUMMARY OF THE INVENTION

Accordingly, certain embodiments of the present invention address the above-mentioned and other problems occurring in the prior art, and an object of the present invention is to provide an apparatus and method for safely transmitting communication content.

To accomplish the above object, an apparatus and method are provided according to exemplary embodiments of the present invention for protecting transmission of communication content where a server transmits content requested by a client and includes a near field communication (NFC) module comprising a key distribution function for transmitting the content to the client through encryption of the content, and the client receives the content from the server and includes a near field communication (NFC) module which receives a key distributed by the near field communication (NFC) module of the server in order to decrypt the encrypted content received from the server.

According to another exemplary aspect of the present invention, an apparatus and method are provided for protecting transmission of communication content where a server comprising an application program delivers a key distribution command if a content request is received from a client and transmits the content to the client if key distribution is completed. An encryption key management module which creates and provides an encryption key. A near field communication (NFC) module performs key distribution by transmitting the encryption key created in the encryption key management module to a near field communication (NFC) module of the client. An encryption/decryption module encrypts the content by using the encryption key. A Bluetooth module transmits the encrypted content to a Bluetooth module of the client.

The client may comprise an application program which requests content from the server and receives the requested content, an encryption key management module which stores an encryption key distributed by the server and provides a decryption key in order to decrypt encrypted content, and the near field communication (NFC) module which receives the encryption key distributed by the near field communication (NFC) module of the server and delivers the encryption key to the encryption key management module.

The client may further comprise an encryption/decryption module which decrypts the encrypted content received from the server so as to provide the content to the application program, and a Bluetooth module which transmits the encrypted content received from the server to the encryption/decryption module.

BRIEF DESCRIPTION OF THE DRAWINGS

The above and other objects, exemplary features and advantages of certain embodiments of the present invention will be more apparent from the following detailed description of certain exemplary embodiments taken in conjunction with the accompanying drawing, in which:

FIG. 1 is a flowchart illustrating a procedure for transmitting communication content according to an exemplary embodiment of the present invention.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figure. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

FIG. 1 is a flowchart illustrating a procedure for transmitting communication content according to an exemplary embodiment of the present invention.

Hereinafter, the structure of a client 100 will be described with reference to FIG. 1. A first application program 110 requests a corresponding program, which is requested by a user, from a second application program 210 of a server 200. If the content of the program is received from the server 200, the first application program 110 reports to the second application program 210 of the server 200 that the content has been completely received.

A first encryption key management module 120 receives and stores an encryption key from the server 200 through a first NFC module 130 and reports to the first application program 110 that the encryption key is distributed. In addition, when the first encryption key management module 120 receives the request of a decryption key from a first encryption/decryption module 140, the decryption key is transmitted to the first encryption/decryption module 140.

The first NFC module 130 performs a key decryption function together with a second NFC module 230 of the server. The first NFC module 130 receives an encryption key from the second NFC module 230 of server 200 and transmits the encryption key to the first encryption key management module 120. Then, the first NFC module 130 reports the distribution of the encryption key to the second NFC module 230 of server 200.

The first encryption/decryption module 140 receives encrypted content transmitted from the server 200 through a first Bluetooth module 150, requests a decryption key from the first encryption key management module 120, and decrypts the encrypted content by using the decryption key. The first encryption/decryption module 140 transmits the decrypted content to the first application program 110.

The first Bluetooth module 150 receives encrypted content through wireless communication with the second Bluetooth module 250 of server 200 and transmits the received encrypted content to the first encryption/decryption module 140.

Hereinafter, the structure of server 200 will be described. If the second application program 210 receives a request for content from the first application program 110 of client 100, the second application program 210 transmits a key distribution command to a second encryption key management module 220. In addition, if the second application program 210 receives from the second NFC module 230 information reporting that key distribution for client 100 is completed, the second application program 210 transmits the content requested by client 100 to the second encryption/decryption module 240.

If the second encryption key management module 220 receives the key distribution command from the second application program 210, the second encryption key management module 220 creates an encryption key so as to transmit the encryption key to the second NFC module 230. In addition, the second encryption key management module 220 transmits the stored encryption key to the second encryption/decryption module 240 if the encryption key is requested by the second encryption/decryption module 240.

The second NFC module 230 performs a key distribution function together with the first NFC module 130 of client 100. The encryption key received from the second encryption key management module 220 is transmitted to the first NFC module 130 of client 100. In addition, if the second NFC module 230 receives from the first NFC module 130 of client 100 the information reporting that key distribution for the client 100 is completed, the second NFC module 230 transmits the information to the second application program 210.

If the second encryption/decryption module 240 receives content from the second application program 210, the second encryption/decryption module 240 requests an encryption key from the second encryption key management module 220. If the second encryption/decryption module 240 has received the requested encryption key, the second encryption/decryption module 240 encrypts the content using the encryption key so as to transmit the content to the second Bluetooth module 250.

Hereinafter, the operation for safely transmitting content through client 100 and sever 200 will be described. If a user of client 100 selects corresponding content to be downloaded among content included in server 200, the first application program of the client requests the content, which is selected by the user, from the second application program 210 of server 200 in step 301.

The second application program 210, having received the content request from server 200, commands the second encryption key management module 220 to start key distribution in step 302.

The second encryption key management module 220, having received the command for key distribution from the second application program 210, creates an encryption key and transmits the created encryption key to the second NFC module 230 in step 303.

The second NFC module 230, having received the encryption key from the second encryption key management module 220, transmits the encryption key to the first NFC module 130 of client 100 in step 304, and the first NFC module 130 of client 100 transmits the received encryption key to the first encryption key management module 120 in step 305.

After the first encryption key management module 120 stores the encryption key, having received an encryption key from the first NFC module 130, the first encryption key management module 120 informs the first application program 110 of the completion of key distribution in step 306.

If the first NFC module 130 finishes transmission of the encryption key to the first encryption key management module 120 in step 305, and then informs the second NFC module 230 of server 200 of the completion of the key distribution in step 307, the second NFC module 230 of server 200 informs the second application program 210 of the fact that key distribution for client 100 is completed in step 308.

The second application program 210, having recognized that the key distribution for the client 100 is completed, transmits the content requested by the first application program 210 of client in step 301 to the second encryption/decryption module 240 in step 309.

The second encryption/decryption module 240, having received content from the second application program 210, requests an encryption key from the second encryption key management module 220 in step 310 and encrypts the content using the encryption key if the second encryption/decryption module 240 receives the requested encryption key from the second encryption key management module 220 in step 311.

If the second encryption/decryption module 240 transmits the encrypted content to the second Bluetooth module 250 in step 312, the second Bluetooth module 250 transmits the encrypted content to the first Bluetooth module 150 through wireless communication together with the first Bluetooth module 150 in step 313.

The first Bluetooth module 150, having received encrypted content from the second Bluetooth module 250 of server 200 through the wireless communication, transmits the encrypted content to the first encryption/decryption module 140 in step 314.

The first encryption/decryption module 140 requests a decryption key to the first encryption key management module 120 in step 315. If the first encryption/decryption module 140 receives the requested decryption key in step 316, the first encryption/decryption module 140 decrypts the encrypted content using the decryption key. Then, the first encryption/decryption module 140 transmits the decrypted content to the first application program 110 in step 317. The first application program 110, having received the content from the first encryption/decryption module 140, transmits to the second application program 210 of server 200 information reporting that the requested content is received in step 318.

As described above, according to exemplary embodiments of the present invention, an encryption key is distributed using NFC so it is possible to safely download communication content by providing effective encryption distribution function. In addition, an effective encryption key distribution function is provided, so it is possible to improve the weak security structure of Bluetooth. Accordingly, a swift and safe symmetric key algorithm can be employed.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims and equivalents thereof.

What is claimed is:

1. A system for protecting transmission of communication content, the system comprising:
    a server comprising a server-side application program;
    a server-side encryption key management module which creates and provides an encryption key to a server-side near field communication (NFC) module;
    the server-side NFC module which transmits the encryption key to a client-side NFC module;
    a server-side encryption/decryption module which encrypts the content using the encryption key and transmits encrypted content;
    a server-side short distance communication module, adapted to support short-distance wireless communication, which transmits encryption content to a client-side short distance communication module;
    a client comprising a client-side application program;
    a client-side encryption key management module which stores an encryption key distributed by the server and provides a decryption key;
    a client-side NFC module which receives the encryption key distributed by the server-side NFC module and delivers the encryption key to the client-side encryption key management module; and
    a client-side encryption/decryption module;
    the client-side short distance communication module which receives the encrypted content from the server-side short distance communication module, and transmits the encrypted content received from the server to the client-side encryption/decryption module;
    wherein the server-side application program delivers a key distribution command to the server-side encryption key management module if a request for content selected to be downloaded among content included in the server is received from the client and transmits the requested content if key distribution is completed;
    wherein the server-side encryption/decryption module supports-short-distance wireless communication;
    wherein the client-side application program requests content from the server and receives the requested content;
    wherein the client-side encryption/decryption module receives the encrypted content from the client-side short distance communication module, decrypts the encrypted content, and transmits the content decrypted to the client-side application program; and
    wherein transmission of communication content occurs between a terminal of the client and a terminal of the server.

2. The system as claimed in claim 1, wherein the server and the client each support a wireless communication link, operating in the unlicensed industrial, scientific and medical (ISM) band at a frequency using a frequency hopping transceiver for real-time Audio/Video (AV) and data communications between hosts, the link being based on time slots.

3. The system as claimed in claim 1, wherein the server-side encryption/decryption module and the client-side encryption/decryption module each support a wireless communication link between devices separated from each other by a distance of no greater than approximately 100 meters.

4. The system as claimed in claim 1, wherein the server and the client each support a wireless communication link between devices separated from each other by a distance of no greater than approximately 10 meters.

* * * * *